United States Patent [19]

Axelsson

[11] 4,149,451

[45] Apr. 17, 1979

[54] LOCK ACTUATOR FOR A SERVICE BRAKE ACTUATOR

[75] Inventor: Lars B. Axelsson, Malmö, Sweden

[73] Assignee: Svenska Aktiebolaget Bromsregulator, Malmö, Sweden

[21] Appl. No.: 747,034

[22] Filed: Dec. 2, 1976

[30] Foreign Application Priority Data

Dec. 8, 1975 [SE] Sweden .............................. 7513772

[51] Int. Cl.² ........................................... F15B 15/26
[52] U.S. Cl. ......................................... 92/17; 92/24; 92/27; 92/151
[58] Field of Search ...................... 92/17, 31, 62, 110, 92/24, 27, 151, 152, 32, 129, 28; 188/67

[56] References Cited

U.S. PATENT DOCUMENTS

| 435,139 | 8/1890 | Frölich | 92/28 |
|---|---|---|---|
| 2,632,426 | 3/1953 | Geesink | 92/17 |
| 2,896,413 | 7/1959 | Hussey | 92/62 |
| 3,288,036 | 11/1966 | Fisher | 92/62 |
| 3,359,862 | 12/1967 | Modrich | 92/28 |
| 3,481,252 | 12/1969 | Williams | 92/62 |
| 3,603,212 | 9/1971 | Geyer | 92/17 |
| 3,684,063 | 8/1972 | Crabtree | 92/17 |
| 3,983,792 | 10/1976 | Furtner | 92/17 |
| 3,999,634 | 12/1976 | Howell | 92/110 |
| 4,019,426 | 4/1977 | Wosejien | 92/129 |

*Primary Examiner*—Martin P. Schwadron
*Assistant Examiner*—Abraham Hershkovitz
*Attorney, Agent, or Firm*—Laurence R. Brown

[57] ABSTRACT

A lock actuator attachment for a pneumatic service brake has a spindle follower for the service brake piston. A freely rotating nut is threaded on the spindle and a brake for preventing nut rotation is operated by a piston that may be pneumatically or hydraulically operated to hold the service brake in actuated position.

3 Claims, 2 Drawing Figures

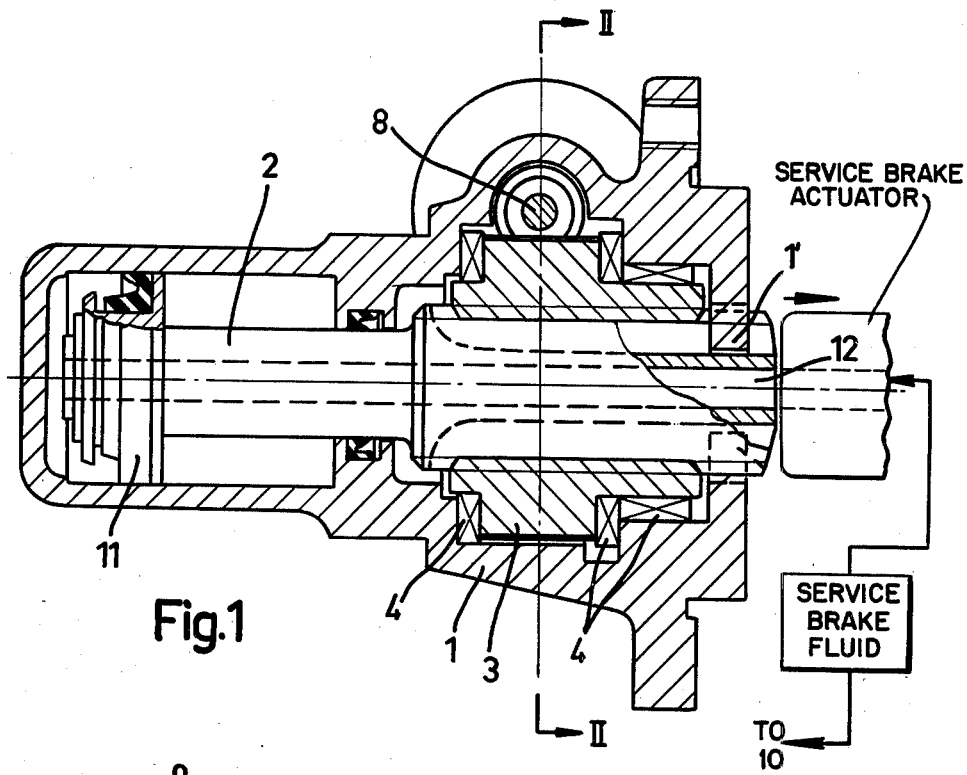
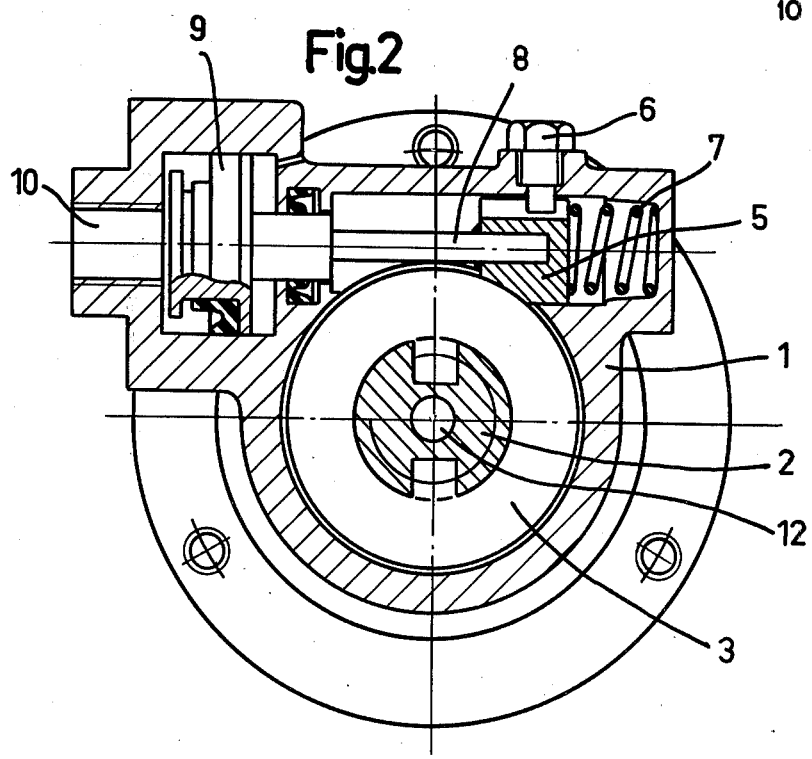

LOCK ACTUATOR FOR A SERVICE BRAKE ACTUATOR

This invention relates to a lock actuator for attachment to a pneumatic service brake actuator and comprising a spindle axially movable relative to a lock actuator housing and arranged to be held against the service brake actuator piston and means to releasably lock the spindle against movement in the brake release direction.

Three different ways are known for enabling the spindle to follow the service brake actuator piston: The spindle may be mechanically connected to the piston, the spindle may be biassed against the piston by means of a spring, or the air pressure may be led through a separate line to a spindle piston for pushing the spindle against the piston. In the first case the mounting and the lateral movements of the piston may cause problems. In the second case the spring force will counteract the actuator return spring force, and in the third case a separate line is needed with adherent drawbacks.

The main object of the invention is thus to obviate these and other problems and drawbacks with the known solutions and to accomplish a reliable and cheap design.

This is according to the invention attained in that a channel is provided through the spindle or in the housing for admitting service brake air pressure to a spindle piston. In this way the air pressure will always act on the spindle piston as well as on the service brake actuator piston.

A further feature of the lock actuator according to the invention, which has a rotatable nut in non-self-locking engagement with the spindle for releasably locking the same, is that a brake block is held against the periphery of the nut by a spring and that there is a cylinder-piston arrangement for removing the brake block from the nut against the action of the spring.

The invention will be described in further detail below, reference being made to the accompanying drawings, in which FIG. 1 is a longitudinal section through a first embodiment of a lock actuator according to the invention, FIG. 2 is a section along the line II—II in FIG. 1.

Referring first to FIGS. 1 and 2 a lock actuator housing 1 is to be attached to a conventional pneumatic service brake actuator (diagrammatically shown) in such a position that a spindle 2 axially movable in the former is coaxial with the service brake actuator piston (diagrammatically shown). A nut 3 is rotatably journalled in the housing 1 by means of bearings 4 and is in non-self-locking engagement with the spindle 2, which is prevented from rotation by means of housing projections 1'.

A brake block 5 guided by a screw 6 cooperates with the periphery of the nut 3 with a certain self-actuation and is held against the nut by a compression spring 7. The brake block 5 is attached to a piston rod 8 and a piston 9 axially movable perpendicular to the axis of the spindle 2 under the action of fluid under pressure admitted through an inlet 10.

The spindle 2 is at its end remote from the service brake actuator (diagrammatically shown) provided with a spindle piston 11 sealed in a conventional way relative to a cylindrical part of the housing 1. A channel 12 extends axially through the spindle 2 to enable service brake air pressure to pass from the service brake actuator at service braking to the spindle piston 11 in order to bias the spindle 2 to the right in the drawing and thus to hold it against the service brake actuator piston (not shown).

The function of the lock actuator together with a service brake actuator is as follows: At the admission of air under pressure to the service brake actuator its piston will move in the brake application direction (shown by the arrow); the fluid will however also be admitted to the spindle piston 11 through the channel 12, so that the spindle 2 will follow the service brake piston movement. At a normal service brake application fluid pressure is also admitted through the inlet 10 to the piston 9, so that the brake block 5 is held out of contact with the nut 3, which thus is free to rotate.

At a normal brake release fluid pressure will prevail at the piston 9, so that the nut 3 is free to rotate and the spindle 2 is free to return to its shown position together with the service brake actuator piston. However, if it is desired to keep the brakes applied in spite of falling air pressure in the service brake actuator it is only necessary to lower the fluid pressure at the piston 9, so that the brake block 5 will lock the nut 3 against rotation, which means that the spindle 2 will lock the service brake piston against return movement, until fluid pressure is readmitted to the piston 9.

It is to be noted that although the service brake actuator is shown and described as being pneumatic it may quite as well be hydraulic. The invention is also applicable to such a service brake actuator.

Modifications are possible within the scope of the appended claims.

What is claimed is:

1. In combination, a pneumatic service brake actuator and an adjacent lock actuator attachment to operate in conjunction with said service brake actuator, the service brake actuator being operable in brake applying and brake release directions, said attachment having a housing, a spindle axially movable within said housing and extending therefrom in contact with a movable part of said service brake actuator, pneumatically operable locking means to releasably lock the spindle against movement in the service brake release direction, piston means always responsive to air pressure present in said service brake actuator to hold said spindle against said movable part of said service brake actuator and cause it to follow the movement thereof during a brake applying stoke, means for actuating the locking means to hold the movable part of said brake actuator in said brake applied position even when fluid pressure in said service brake actuator falls and means for disengaging the locking means to permit the movable part of said brake actuator to move in the brake release direction.

2. The lock actuator defined in claim 1, with a non-rotatable spindle, wherein the locking means comprises a rotatable nut in non-self-locking engagement with threads on the spindle, and the means actuating the locking means comprises a compression spring acting on a brake preventing rotation of said nut.

3. The lock actuator defined in claim 2, wherein the brake comprises a movable brake block and the disengaging means comprises a fluid pressure responsive cylinder-piston arrangement for removing said brake block from said nut against the bias of the compression spring.

* * * * *